US006961986B1

(12) United States Patent
Müller

(10) Patent No.: US 6,961,986 B1

(45) Date of Patent: Nov. 8, 2005

(54) METHOD AND APPARATUS FOR FASTENING AN AUXILIARY JOINING ELEMENT AND WORK PIECE

(75) Inventor: Rudolf Müller, Frankfurt am Main (DE)

(73) Assignee: Profil Verbindungstechnik GmbH & Co. KG, (DE)

( * ) Notice: Subject to any disclaimer, the term of this patent is extended or adjusted under 35 U.S.C. 154(b) by 0 days.

(21) Appl. No.: 10/031,655

(22) PCT Filed: May 10, 2000

(86) PCT No.: PCT/EP00/04153

§ 371 (c)(1), (2), (4) Date: Jun. 28, 2002

(87) PCT Pub. No.: WO00/71293

PCT Pub. Date: Nov. 30, 2000

(51) Int. Cl.$^7$ ............................................... B23P 11/00

(52) U.S. Cl. ......................... 29/432.2; 29/505; 29/509; 29/521; 29/525.01; 29/283.5; 411/176; 72/354.2; 72/372

(58) Field of Search ............................... 29/432.2, 505, 29/509, 521, 525.01, 525.02, 798, 243.53, 29/283.5; 411/176, 177, 180, 427; 72/372, 72/354, 354.2

(56) References Cited

U.S. PATENT DOCUMENTS

| | | | | |
|---|---|---|---|---|
| 4,306,511 | A * | 12/1981 | Ashby et al. | 29/521 |
| 4,430,034 | A * | 2/1984 | Fujikawa | 411/179 |
| 5,208,974 | A * | 5/1993 | Sawdon et al. | 29/798 |
| 5,340,251 | A * | 8/1994 | Takahashi et al. | 411/179 |
| 5,528,812 | A * | 6/1996 | Muller | 29/432.2 |
| 5,782,594 | A * | 7/1998 | Muller | 411/176 |
| 5,884,386 | A * | 3/1999 | Blacket et al. | 29/522.1 |
| 5,953,813 | A * | 9/1999 | Sickels et al. | 29/798 |
| 6,092,270 | A * | 7/2000 | Sawdon | 29/243.5 |
| 6,108,893 | A | 8/2000 | Wojciechowski et al. | |
| 6,146,072 | A * | 11/2000 | Muller | 411/176 |
| 6,220,804 | B1 * | 4/2001 | Pamer et al. | 411/80 |
| 6,651,300 | B1 | 11/2003 | Muller | |

FOREIGN PATENT DOCUMENTS

| | | | |
|---|---|---|---|
| DE | 19647831 A1 * | 5/1998 | B21D 39/00 |

* cited by examiner

*Primary Examiner*—David P. Bryant
*Assistant Examiner*—Jermie E. Cozart
(74) *Attorney, Agent, or Firm*—Greenberg Traurig LLP; Eugene C. Rzucidlo

(57) ABSTRACT

An auxiliary joining element is joint to a sheet metal work-piece with a foot deformed to interlock the auxiliary joining element to the sheet metal work-piece. The foot is depressed into the sheet metal work-piece, which is retained over a die having a recess defined by a wall. The wall is interrupted by die parts that are movable radially inwardly of the wall. The foot deforms the sheet metal work-piece into the recess and simultaneously forces the die parts radially inwardly of the wall. Spaced undercuts are formed by the die parts in the foot and the deformed sheet metal work-piece for retaining the auxiliary joining element to the sheet metal work-piece.

11 Claims, 6 Drawing Sheets

METHOD AND APPARATUS FOR FASTENING AN AUXILIARY JOINING ELEMENT AND WORK PIECE

Figure 1:
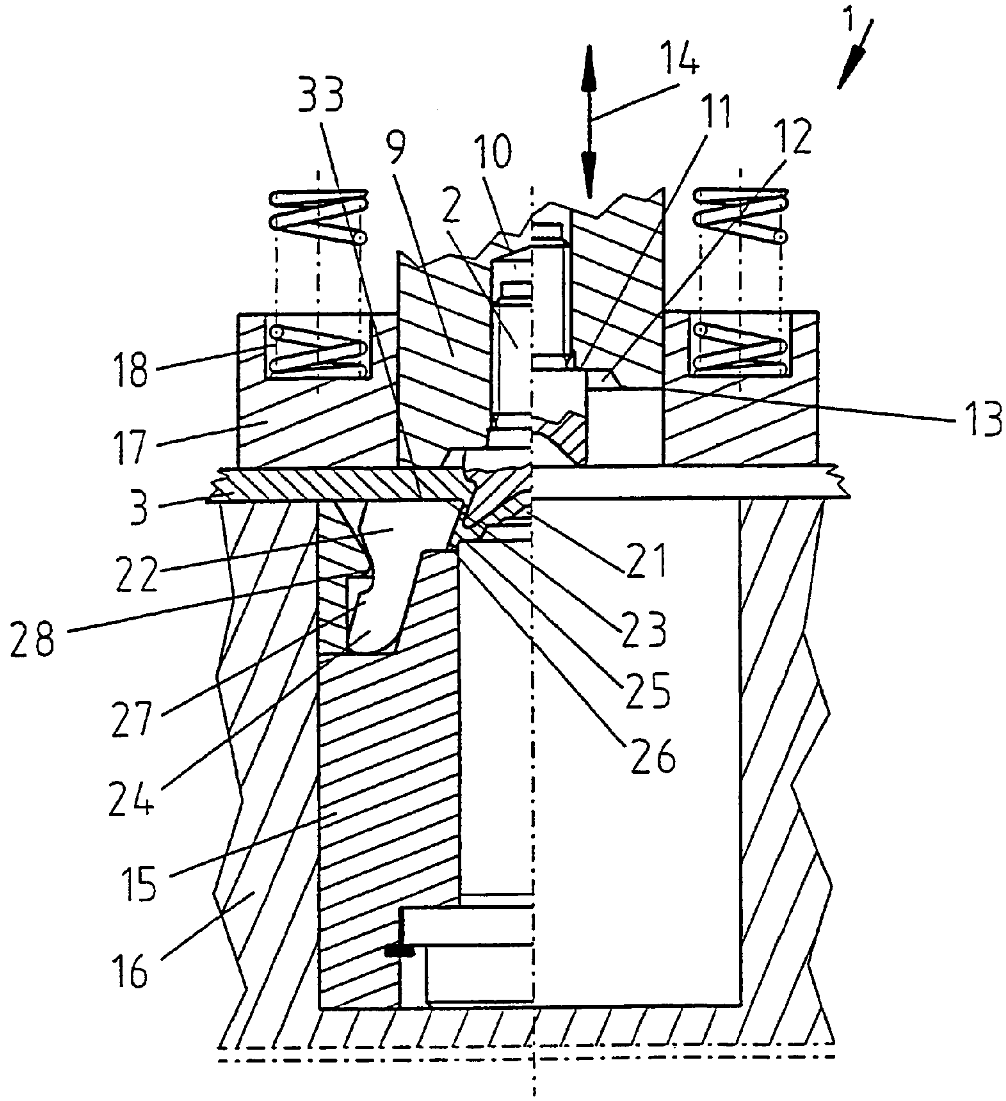

The invention relates to a method of fastening an auxiliary joining element to a sheet-metal-like work-piece in which a foot of the auxiliary joining element is pressed from one side into the work-piece and deforms this in pot-like manner. Furthermore, the invention relates to an apparatus for the fastening of an auxiliary joining element to a sheet-metal-like work-piece having a die which has a recess and having a holder for the auxiliary joining element which is arranged in alignment with the recess and can be moved in a pressing direction relative to the die. Finally the invention relates to a work-piece having an auxiliary joining element in which the work-piece has an outwardly directed projection into which a foot of the auxiliary joining element projects.

The term "sheet-metal-like work-piece" in connection with the present invention not only means a piece of sheet metal but rather work-pieces which are formed, at least in the region of the auxiliary joining element in plate-like manner with a relatively small wall thickness, with the material of the work-piece being capable of being deformed to an adequate degree. In addition to pieces of sheet-metal plastic panels also fall under the term of a sheet-metal-like work-piece.

In some cases it is necessary to connect an auxiliary joining element with the work-piece in order, with the aid of the auxiliary joining element, to be able to attach third elements to the work-piece. Auxiliary joining elements can for example be threaded bolts which have an external thread onto which a nut having a thread can be screwed. Auxiliary joining elements can also have an internal thread into which a bolt can be screwed. This listing is however not exclusive. Auxiliary joining elements are required in large numbers in motor vehicles and domestic appliances for the attachment and holding of trim panels and conducting lines. Grooving or roughness on their surface is frequently sufficient for the attachment of other parts.

Such auxiliary joining element having the advantage that they can be connected to the work-piece without the supply of heat being necessary for this purpose, as is the case with welding or solding for example. Other aids, such as adhesives are not necessary. Accordingly the connection of the auxiliary joining element to the work-piece by forming is always of advantage when different materials are used for the work-piece and the auxiliary joining element which cannot otherwise be connected without further ado.

In the simplest case the auxiliary joining element is pressed into the work-piece and deforms the latter in such a way that it has, at the side opposite to the auxiliary joining element, a pot-like or beaker-like outwardly directed projection. This auxiliary joining element is then clampingly held in the work-piece. A connection of this kind has indeed in most cases adequate shear strength. The resistance against head pull-out and the security against rotation are however restricted.

DE 30 03 908 A1 shows a stud having piercing and riveting behaviour. This stud produces an opening by piercing on being inserted. The slug which results is retained in a recess at the underside of the stud. The peripheral wall of this recess is bent radially outwardly towards the end of the piercing process and then engages around a likewise bent-over edge of the work-piece which has arisen during the piercing process.

DE 22 44 945 A1 shows a method for the mechanical connection of sleeve-like parts with plate-like parts in which the plate-like part must be pierced prior to the introduction of the sleeve-like part. The sleeve-like part has in this respect various "feet" which have to be bent outwardly after insertion.

DE 196 47 831 A1 shows a method for the attachment of a functional element, for example a stud, to a sheet-metal work-piece in which the foot of the stud has projections and recesses through which undercuts of the work-piece form with the foot of the stud during the insertion.

The invention is based on the object of securing an auxiliary joining element which can be loaded in several directions to a work-piece in a simple manner.

This object is satisfied in a method of the initially named kind in that the foot forms an undercut with the work-piece and the undercut is restricted to predetermined peripheral regions.

With this manner of proceeding one not only presses the auxiliary joining element into the work-piece, with the work-piece being deformed. The auxiliary joining element is also deformed in this way at its foot. The foot is deformed at least partially radially outwardly in relation to the peripheral direction and thereby forms an undercut to the work-piece, which is likewise deformed radially outwardly in these regions. "Radial" here relates to the main axis of the auxiliary joining element, for example its thread axis. With this design one achieves on the one hand an improved strength against head pull-out. The auxiliary joining element is secured more strongly against being pulled-out of the work-piece. As a result of the interrupted undercut in the peripheral direction care it is also ensured that the auxiliary joining element is secured in the work-piece against rotation. Thus, the screwing on of nuts or the screwing of bolts into the auxiliary joining element is such screw connections can be pulled tight with a relatively high torque. Finally this design has the advantage that one obtains a connection between the auxiliary joining element and the work-piece in which the auxiliary joining elements and the work-piece contact one another with a relatively high pressure, in particular of the region of the undercuts. This pressure remains even after completion of the connection. This is in particular favourable when an electrical current is to be transferred via the auxiliary joining element to the work-piece, for example, when the auxiliary joining element is used as a ground connection bolt in the sheet metal of a vehicle body.

Preferably one allows material to flow from regions without undercut into regions with undercut. For the manufacture of the undercut regions there is now more material available. One can, in other words, now concentrate the material which is normally available at the entire periphery of the pot-like outwardly deformed projection into a few undercut regions. Thus it is possible, with the same quantity of material, to allow the undercut to project further or deeper perpendicular to the pressing direction. One has found that the strength of the connection is dependent to a stronger degree on the depth of the undercuts than it is on the length in the peripheral direction. Thus, if one restricts the undercuts to regions in the peripheral direction these regions can be designed with greater overlap in the undercut region and the connection as a whole is then stronger and indeed both with respect to the head pull-out strength and also with respect to the security against rotation.

One preferably produces wall sections which extend parallel to the pressing direction at the outer side of the work-piece which lies opposite to the auxiliary joining element. This design have several advantages. On the one hand the demolding, i.e. the extraction of the work-piece provided with the auxiliary joining element out of the corresponding apparatus, for example out of a die, is relatively simple. In the regions where the outer side extends parallel to the pressing direction one then no longer has to perform any deformation work in order to remove the work-piece. It is only necessary to overcome the adhesive friction forces. On the other hand, one can, particularly with at least approximately vertical peripheral walls, ensure that ideal flow paths into the undercut regions are present for the two materials of the work-piece and the auxiliary joining part.

One advantageously produces a closing force on at least one tool part when pressing via the work-piece and an opening force on the tool part which is arranged in the region of an undercut on extracting the unit formed by the work-piece and the auxiliary joining element. The method is thus quasi self-controlling. In the region of the recess there is located a tool part which is so formed that an undercut arises when the material of the work-piece is pressed in there. Since this tool part is held by the work-piece in its closed position the tool part cannot open. The situation is however different when the work-piece is extracted from the tool. In this case the pressure on the tool part drops away. This can then open and releases the work-piece. For the opening a very small force is required. During the open process no reverse deformation can accordingly be brought about.

Preferably three or more undercut peripheral regions are produced. In this way a connection can be achieved which is supported on all sides perpendicular to the tensile force. The more undercut regions that are present the better is the security against rotation.

One preferably applies the pressure to the auxiliary joining element at an auxiliary shoulder. This is in particular of advantage when the auxiliary joining element is provided with a thread. The auxiliary shoulder is then so positioned that the thread is not compressed, or deformed in another manner, when applying the pressure.

The auxiliary shoulder is preferably arranged adjacent to the work-piece. Thus only a very short length of the auxiliary joining element is available in which the auxiliary joining element can be deformed. In the remaining length a region can then be provided which receives the thread, which in this embodiment can, intentionally, no longer be deformed.

In a preferred embodiment provision is made that at least one further sheet-metal-like work-piece is arranged between the work-piece and the auxiliary joining element and is likewise of a pot-like shape with undercuts restricted in the peripheral direction. One can simultaneously use the auxiliary joining element in order to produce a through clinched connection. The auxiliary joining element then forms a "lost plunger" i.e. additionally secures the through clinched connection against release. For the further work-piece the same applies with respect to the nature of the sheet-metal part as for the above-named first work-piece. It need not, however, be of the same material. For example, one can in this manner connect a piece of sheet-metal with a plastic part and the auxiliary joining element. The connection of the two sheet-metal-like components additionally has an extraordinarily high shear force and head pull-out strength. Moreover, the connection of the two components is sealed because no openings or cut joints are produced.

The object is satisfied by an apparatus of the initially named kind and in that the peripheral wall of the recess has wall sections which are arranged on levers, with the levers being movable by pressure in the pressing direction to a working position and being fixable there and forming undercut regions and being movable by a movement of the unit comprising work-piece and auxiliary joining element opposite to the pressing direction into a release position in which the undercut regions are fully released.

With a joining apparatus of this kind one first of all obtains a relatively simple layout of the die. Through the use of levers or fingers which can be brought into their working position and held there by the pressing process itself one saves auxiliary aids such as springs or other pre-stressing means which are required in order to place the die in the closed state, which one requires in order to be able to start the deformation at all. The levers move into their working position at the instant where the tool is pressed onto the die and is subjected to pressure via the auxiliary joining element; they are thus moved radially inwardly, i.e. pivoted and then make available undercut regions. They cannot move out of this working position and indeed also not under the pressure of the inflowing material because they are held in the working position by the work-piece itself. The undercuts formed by the levers now make a space available into which the material of the work-piece and of the foot of the auxiliary joining element can flow. In this connection one can assume that not only the material of the work-piece flows into the undercut region, but rather also the material of the foot of the auxiliary joining element, so that the auxiliary joining element forms an undercut with the work-piece in the sense of a form-fitted hooked engagement. With an undercut of this kind, which can also be recognized at the die side, the extraction of the work-piece from the die would normally signify a certain problem. In accordance with the invention this problem does not however arise because on lifting the work-piece the corresponding lever is moved outwardly, i.e. pivoted, so that it can enter into the release position where it fully releases the work-piece. In this connection the lever only has to overcome small spring forces, so that the extraction of the work-piece can take place with relatively little effort. The fact that, on removing the work-piece from the die, the levers do not stretch the underside of the work-piece under pressure, so that corresponding tracks can be largely avoided, comes as a further advantage. This not only protects the work-piece but rather also the corresponding contact surfaces on the levers.

The levers preferably have a substantially planar top side which in the working position stand perpendicular to the pressing direction and lies in the same plane as the top side of the die. Thus the pressing force acts in such a way that the levers are only loaded in the closing direction. The levers do not have to bear any lateral forces. Because the work-piece, so to say, sees an oppositely continuous and planar surface, if one ignores the recess, then no markings arise in the surface of the work-piece outside of the connection zone. Pressure peaks on the levers can be avoided. The loading takes places relatively uniformly in the working position so that the levers are protected and accordingly have a relatively long working life.

Each lever is preferably formed as a cranked lever. The pressing force which is used for the movement of the levers into the working position and for the holding of the levers can then act on a larger area. The lever transmission ratios are more favourable here so that one can also bear the required forces with a relatively weakly dimensioned lever.

In a preferred manner the cranked lever has a short arm on which the wall section is arranged and a long arm at which a pivot axis or a pivot region is located. The lever is thus formed in the manner of an upside-down L, can however also have further projections or recesses. The wall section which forms a part of the side-wall of the recess of the die and thus the undercut regions is located at the end face of the short limb. The forces which act here are passed on by a relatively long lever arm to the pivot axis or to the pivot region. The term "pivot region" gives expression to the fact that the pivot axis can move along the lever. If one now allows the closing forces to act via a similarly long lever arm, i.e. on the outer side of the short limb of the "L" then a good force equilibrium occurs with a relatively small degree of cost and complexity.

In an alternative embodiment the lever has an outer side which includes an acute angle with the pressing direction and is guided on a correspondingly inclined counter-surface which extends outwardly opposite to the pressing direction. This counter-surface is arranged in the housing in which the die is arranged. If now the pressing force acts via the work-piece onto the lever then the lever is displaced on the inclined surface in the pressing direction and correspondingly moves radially inwardly so that it forms an undercut region. The lever can not deviate upwardly or radially outwardly even when the material of work-piece is forced radially outwardly because it is held firm radially from the outside by the counter-surface and a movement upwardly is prevented by the contacting work-piece. Depending on how much the counter-surface and the outer side of the lever arm are inclined, very high contact pressure forces can be achieved here so that correspondingly high forces can also be applied for the forming of the work-piece.

At least three levers are preferably arranged distributed in the peripheral direction of the recess. With a uniform arrangement of this kind one can expect a connection of the auxiliary joining element with the work-piece which can be uniformly loaded in all directions.

Stationary wall sections which extend substantially parallel to the pressing direction are preferably provided between the movable wall sections. In this way only individual sections result along the wall of the recess of the die in which an undercut is present. In the remaining wall sections a cylindrical form of the work-piece results at the side opposite to the auxiliary joining element. This results in a security against rotation with a relatively high strength. The demolding, i.e. the removal of the work-piece from the die is simplified. In the regions where the wall sections extend parallel to the pressing direction one can simply pull the work-piece opposite to the pressing direction out of the die. Only in the remaining regions it is necessary for the levers to pivot outwardly. A further advantage lies in the fact that, as explained in connection with the method, more material is available for the formation of the undercut. In this way it is possible to allow the undercut overlap to become larger outwardly, i.e. perpendicular to the pressing direction. This possibility results from the fact that material can be displaced from the regions with stationary wall sections into the undercut regions.

The die preferably has a security against drop-out for each lever. The security against drop-out has two advantages. On the one hand, on the moving a work-piece from the die one no longer needs to pay attention to the fact that the levers remain in the die. These are rather held by the security against drop-out. Oh the other hand one can now use the die in an "overhead" position, i.e. the auxiliary joining element can be brought into engagement with the work-piece from below as seen in the direction of gravity. In this way one obtains in a higher degree of flexibility with respect to the installation position in the operation of the apparatus.

The plunger preferably has a recess into which a shaft of the auxiliary joining part projects and which is surrounded by a pressure surface, with the auxiliary joining element having an auxiliary shoulder which lies on the pressing surface. In this way one can achieve a situation in which the auxiliary joining element is admissibly guided by the plunger. The loading can however be restricted to regions of the auxiliary joining element which lie outside of the guide and thus of the plunger. An impermissible deformation of the auxiliary joining element is avoided in this way, particularly when using threads on the auxiliary joining element.

The object is satisfied by a work-piece with an auxiliary joining element in that the foot forms an undercut with the work-piece and the undercut is restricted in the peripheral direction to predetermined peripheral regions. In this way one can achieve a situation in which a relatively high security against rotation is achieved. In addition the depth of the undercut, i.e. the depth of the form-locked hooked arrangement, can be made relatively large. The material required for this can originate from the regions in which no undercut is present. The flow characteristics, and also the combination of the auxiliary joining element and the work-piece can be optimized through the forming at the active surfaces of the levers forming the undercut. The size and the location of the form-fitted hooked connection can be optimized and defined by the choice of the predetermined peripheral regions and the depth of the undercut.

Figure 2:
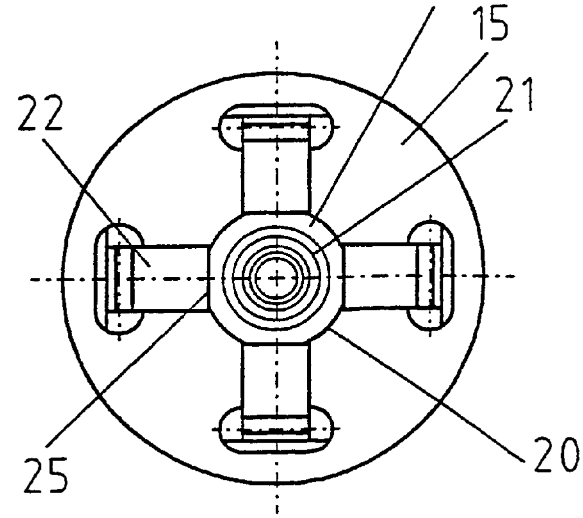
Figure 3:
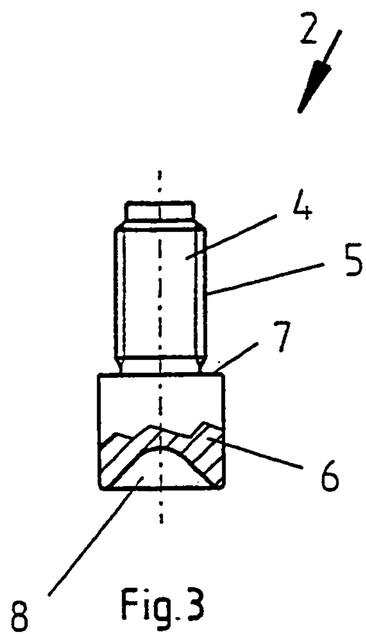
Figure 4:
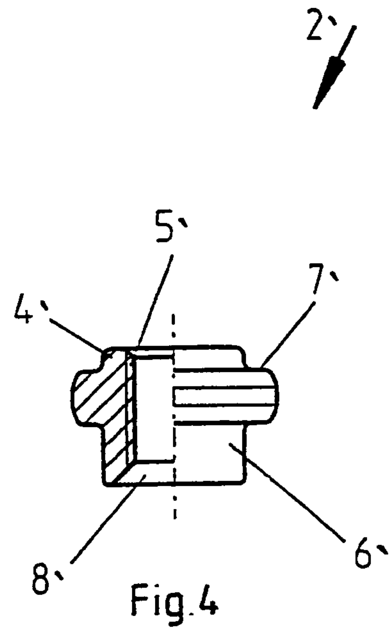
Figure 5:
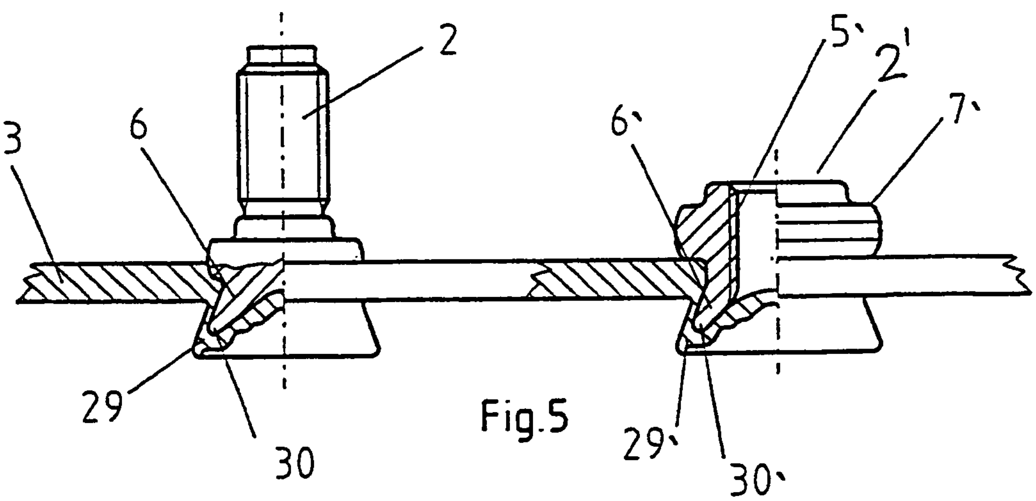
Figure 6:
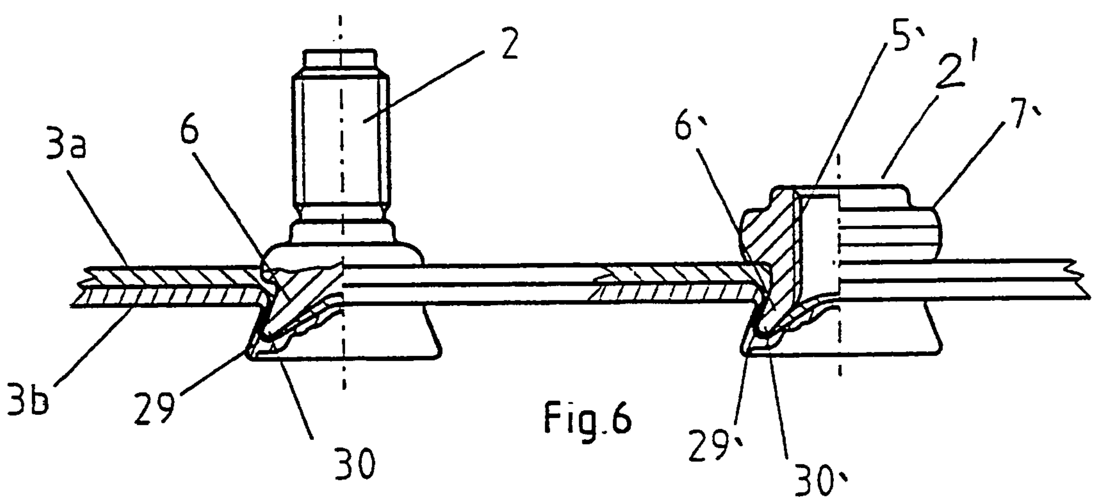
Figure 7:
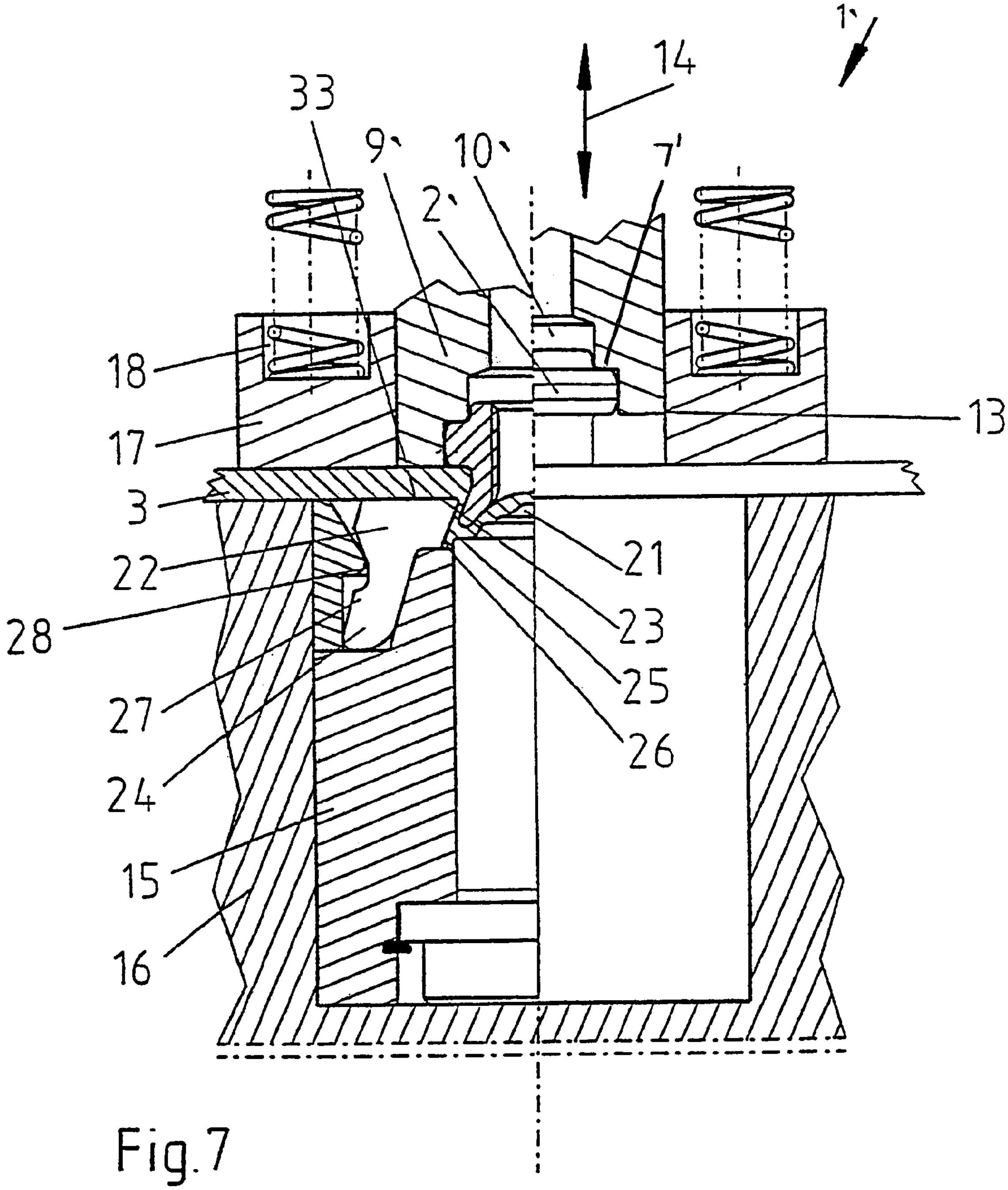
Figure 8:
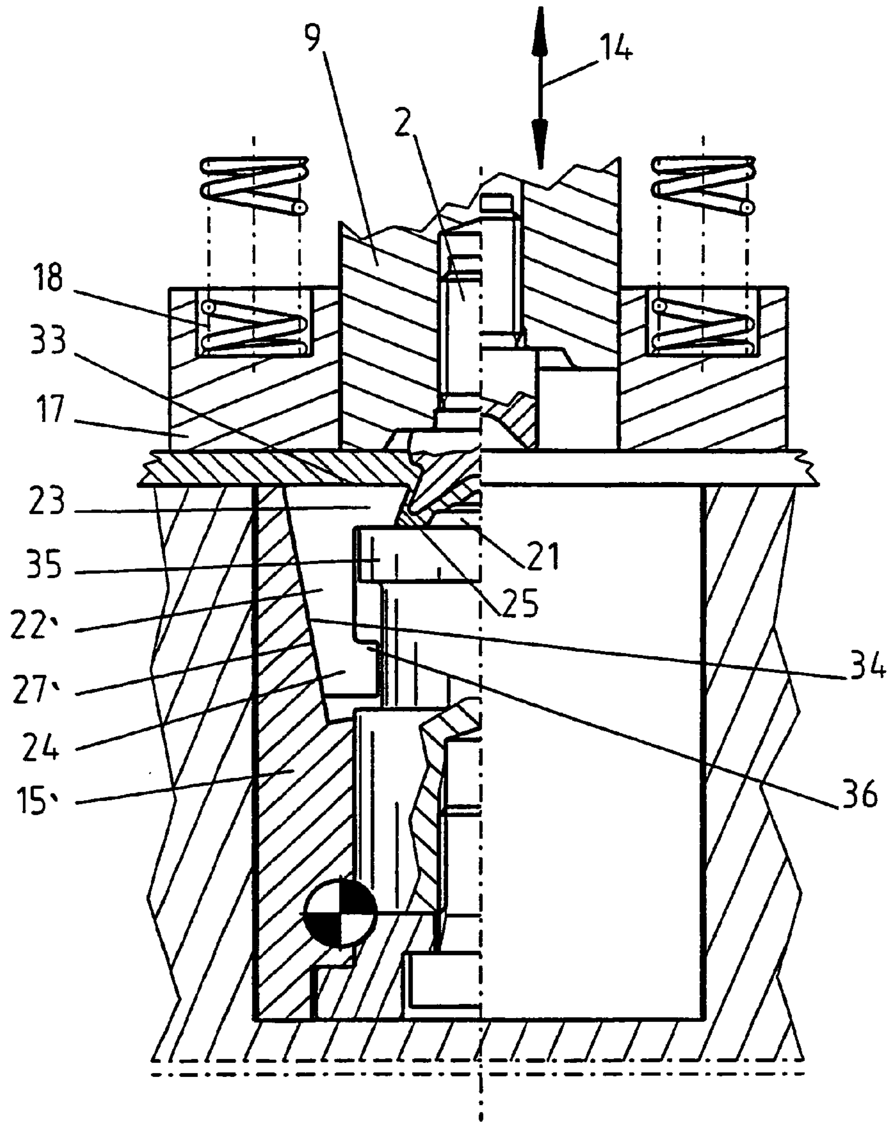
Figure 9:
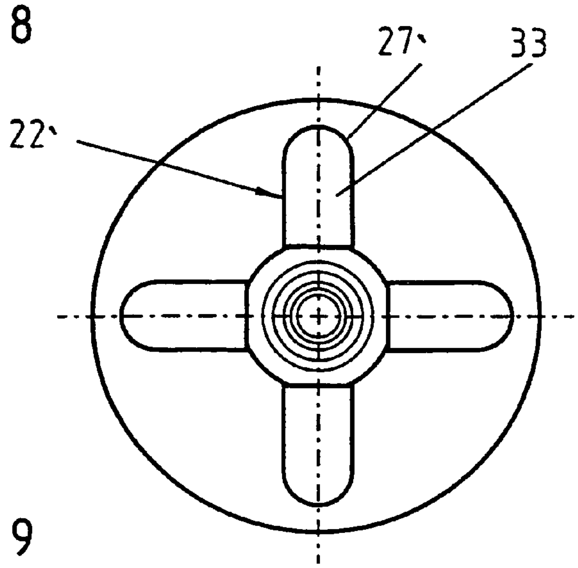

The invention will be described in more detail in the following with reference to preferred embodiments in conjunction with the drawing in which are shown:

FIG. 1 a schematic view of an apparatus for the connection of an auxiliary joining element to a sheet-metal-like work-piece, FIG. 2 a plan view of a die of the apparatus of FIG. 1, FIG. 3 an auxiliary joining element, FIG. 4 another embodiment of an auxiliary joining element, FIG. 5 a work-piece with auxiliary joining elements secured therein, FIG. 6 a schematic representation of a connection of two sheet-metal-like components with the aid of auxiliary joining elements and FIG. 7 a representation corresponding to FIG. 1 with another auxiliary joining element, FIG. 8 an apparatus which has been modified relative to FIG. 1, FIG. 9 a view corresponding to FIG. 2, and FIGS. 10*a*–10*d* various stages while operating with the apparatus of FIG. 8

FIG. 1 shows an apparatus for the connection of an auxiliary joining element 2 to a sheet-metal-like work-piece 3.

The sheet-metal-like work-piece 3 can also be formed from sheet-metal. It can however also be a work-piece of plate-like form, at least section-wise of a plastic material which can be deformed similarly to metal sheets.

Examples for auxiliary joining elements are shown in FIGS. 3 and 4 with the auxiliary joining element of FIG. 3 corresponding to that of FIG. 1.

The auxiliary joining element 3 which is shown in FIG. 3 comprises a shaft 4 with an external thread 5 and thus forms a threaded bolt. The shaft 4 is connected to a foot 6 which has a somewhat larger diameter than the shaft 4. The difference in diameter forms an auxiliary shoulder 7. The foot 6 has a substantial cylindrical outer periphery. At its base side it has a recess 8 which facilitates a deformation, as will be later explained in conjunction with the method of the proceeding.

FIG. 4 shows an alternative embodiment of an auxiliary joining element 2' in which the same parts are provided with the same reference numerals. The shaft 4' has in this case an inner thread 5' so that the auxiliary joining element 2' forms a nut element into which a screw can be inserted in order to connect the screw to the work-piece 3.

Instead of the two illustrated auxiliary joining elements 2, 2' other auxiliary joining elements can naturally also be used so long as these have a fastening profile, for example one or more grooves and/or project out of the work-piece 3 in such a way that they still make a fastening surface available.

The apparatus 1 with which the auxiliary joining element 2 is connected to the work-piece 3 has a plunger 9 which contains a bore 10 into which the auxiliary joining element 2 can be inserted. In this arrangement the diameter of the bore 10 is matched to the outer diameter of the shaft 4 so that the auxiliary joining element 2 is received with little clearance in the plunger 9. A pressing surface 11 is arranged around the bore 10 with which the plunger 9 presses onto the auxiliary shoulder 7 of the auxiliary joining element 2. The pressing surface 11 is arranged in a recess 12 which is surrounded by a peripheral boundary 13. The plunger 9 is movable in the direction of a double arrow 14. The orientation of FIG. 1 will be used for the subsequent explanation, i.e. the plunger 9 is movable upwardly and downwardly. The pressing direction is directed downwardly.

The apparatus 1 furthermore has a die 15 which is arranged in a die holder 16. The work-piece 3 can be pressed into the die 15 with the aid of hold-down members 17 which stand under the action of springs 18.

The die 15 has a recess 19 the basic shape of which is cylindrical. The recess 19 is thus surrounded by wall sections 20 which extend parallel to the pressing direction 14 and have a form of a cylindrical jacket surface. At the base of the recess 19 a step-like projection 21 is provided which, as will be explained further below, facilitates the flowing of the material during the connection of the auxiliary joining element 2 and the work-piece 3.

The cylindrical outer wall 20 is interrupted by levers 22. One such lever is shown in its working position in FIG. 1. In this position its upper side 33 lies flush with the upper side of the die 15.

The lever 22 has the shape of an inverted L with a short limb 23 and a long limb 24. In the working position it lies with both limbs in contact with the die 15, i.e. it is completely supported.

The short limb 23 forms with its end face 25 a part of the peripheral wall of the recess 19. In the working position this end face 25 is inclined, i.e. opens downwardly somewhat so that the material of the work-piece 3 can flow into the free space 26 which is formed by the inclined end face 25 of the lever 22.

In the peripheral direction four levers 22 are provided which interrupt the cylindrical outer wall 20 of the recess 19. Accordingly, on pressing the auxiliary joining element 2 into the work-piece 3 a total of four undercut regions are produced.

As can be seen from FIG. 1 the lever 22 is movably mounted in the die 15. It has at its "rear side", i.e. the side which is remote from the recess 19, a shoulder 26, so that it can be lifted in the die 15 until the shoulder 27 comes into contact with the projection 28 of the die. The projection 28 thus forms, together with the shoulder 27, a security against drop-out. The projection 28 also serves as a turning or tilting point for the lever 22 with the lever 22 being able to slide outwardly along the projection 28 during tilting.

On lifting of the lever 22 the lever 22 can swing outwardly, i.e. the end face 25 can move upwardly and simultaneously outwardly so that the short limb 23 of the lever 22 fully frees the recess 19, so that the work-piece 3 can b removed from the die 15.

For the attachment of the auxiliary joining element 2 in the work-piece 3 the auxiliary joining element 2 is inserted into the recess 10 of the plunger 9. The work-piece 3 is held tight on the die 15 with the aid of the hold-down members 17. This starting position is shown in the right hand half of FIG. 1.

The plunger 9 is then lowered onto the die 15. The plunger 9 presses the auxiliary joining element downwardly at its auxiliary shoulder 7. In this way the work-piece 3 is deformed. In the sections of the recess 19 which are restricted by the cylinder wall 20 a beaker-like or pot-like outwardly directed projection is produced. As a result of the inclined end face 25 of the lever 22 a part of the material however also flows into the free space 26 and thus forms undercuts 29, as can be seen in FIG. 5.

With this deformation process the foot 6 with the auxiliary joining element 2 is also deformed. In the region of the undercuts 29 the foot 6 forms undercuts 30 with the work-piece 3. This deformation is assisted by the projection 21, which presses the material of the work-piece 3 into the recess of the foot 6 of the auxiliary joining element 2 and ensures, on continuation of the connection process, that the material of the foot 6 forms the undercuts 30.

Since the plunger 9 only acts on the auxiliary shoulder 7 of the auxiliary joining element 2 the thread 5 is not deformed. The pressing movement ceases when the peripherally extending wall 13 of the plunger 9 comes into contact with the work-piece 3.

Since the undercuts 29, 30 are not continuous in the peripheral direction, but rather interrupted, it is possible to allow material to flow from the cylindrical sections into the undercuts 29, 30, so that here the depth of undercut can be increased.

It can be seen from FIG. 5 that the auxiliary joining element 2' formed as a nut (FIG. 4) can be inserted into the work-piece 3 in a similar manner to the auxiliary joining element 2 formed as a bolt. In both cases the corresponding undercuts 30, 30' at the foot 6, 6' results which cooperate with corresponding undercuts 29, 29' at the work-piece 3. Thus not only does a high head pull-out strength and shear strength result in the connection of the auxiliary joining element 2, 2' in the work-piece 3, but rather a relatively high resistance against rotation results from the fact that the undercuts are restricted in the peripheral direction.

The illustrated auxiliary joining elements 2, 2' can also be formed without a thread. With a bolt grooves or other measures by which the surface can be made with higher grip can also be sufficient if required. With auxiliary joining elements of this kind it is sufficient in many cases to set a clamping element in place in order to secure a part to be fastened at the auxiliary joining element 2. A similar situation applies for the auxiliary joining elements 2' which are shown at the right in FIGS. 4 and 5 in which an internal thread 5' is not absolutely essential.

In the right hand half of FIG. 5 it can be seen that the connection of the auxiliary joining element 2' formed as a nut forms an additional advantage. A sealed connection namely results between the nut and the work-piece 3, so that no additional measures are necessary for a seal.

FIG. 6 shows a connection of the auxiliary joining elements 2, 2' corresponding to the illustrations of FIG. 5 with not only one work-piece 3 but rather with two work-pieces 3*a*, 3*b*. These work-pieces are held by a through clinched connection, with the auxiliary joining element 2, 2' remaining as a "lost plunger" in the work-pieces 3*a*, 3*b*. The work-pieces 3*a*, 3*b* are connected together with a relatively high head pull-out strength and shear strength. The auxiliary joining element 2, 2' is reliably held.

FIG. 7 shows an apparatus corresponding to the representation of FIG. 1. The same parts are provided with the same reference numerals. The only thing which is changed is the plunger 9' in order the receive the auxiliary joining element 2. It can also be seen from FIG. 7 that one can press with the auxiliary joining element 2' onto an auxiliary shoulder 7' which is not provided beneath the thread but rather radially alongside the thread. As a result of the relatively large material thickness the thread is however not deformed by the pressure but rather retains its accuracy with respect to a thread gage.

FIG. 8 shows an embodiment modified relative to FIG. 1 of an apparatus for the connection of the auxiliary joining element 2 to the sheet-metal-like work-piece 3. The same parts are provided with the same reference numerals while corresponding elements are characterized by the same reference numerals with a dash.

In comparison to the embodiment of FIG. 1 only the form of the levers 22' and in the die 15 has basically changed. The lever 22' has, now as previously, a short limb 23 with a top side 33 and an end face 25, with the end face 25 forming the movable undercut regions. The short limb 23 is also connected to a long limb 24. This limb 24 however has an outer side 27' which one can compare with the shoulder 27 in the lever of FIG. 1 which in the section of FIG. 8 forms a straight line. In cross-section it can naturally also by semi-circularly rounded as can be recognized in FIG. 9. This outer side 27' does not extend parallel to the pressing direction 14, but is rather inclined to it and thus includes an acute angle with the pressing direction 14, with the corresponding wall 34 of the die being so directed that the corresponding recess bounded by the wall 34 opens radially upwardly, i.e., towards the plunger 9. Accordingly, the lever 22' is moved radially outwardly when it is lifted. This movement is restricted by a ring 35 which is arranged beneath the projection and which is contacted by a lever projection 36 at the lower end of the lever 22' when the lever 22' has been drawn out upwardly by a sufficient amount. This should be explained with reference to FIGS. 10*a*–10*d*. FIG. 10A shows the situation which results when the auxiliary joining element 2 has been pressed into the work-piece 3 and the corresponding undercut regions 29 have formed. The work-piece 3 presses in this arrangement onto the upper side 33 of the lever 22', so that the lever 22' is held fast in the die 15' and cannot deviate radially.

After termination of the joining process the work-piece 3 is lifted. Since the undercut region 29 basically does not pass through the opening which the levers 22' leave free at their top side, the levers 22' are lifted with it and are drawn out of the die 15' in the pressing direction (in the illustrated embodiment in a vertical direction). During this they wander radially outwardly as can be seen in FIG. 10B.

At the end of this movement the lever projection 36 comes into contact with the ring 35. These two parts thus together form a security against drop-out. The ring 35 is so positioned that at the end of the movement the opening between two oppositely disposed levers 22' is precisely so large that the undercut regions 29 can be drawn out. This can be recognized into FIG. 10*c*.

Figure 10D:
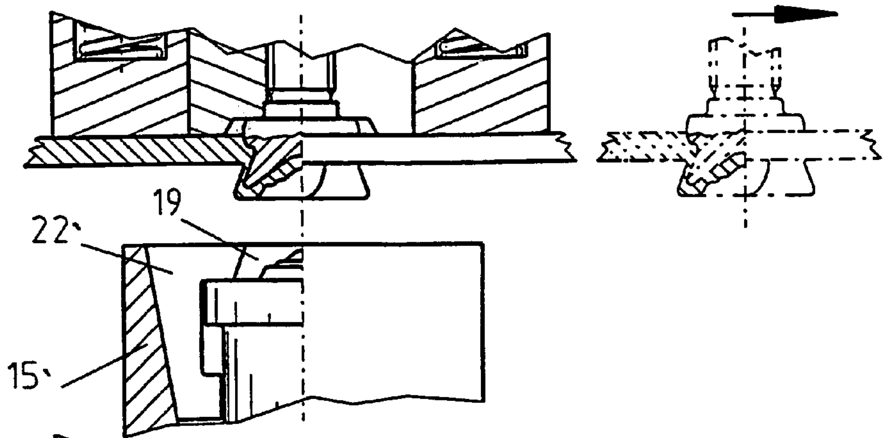
Figure 10C:
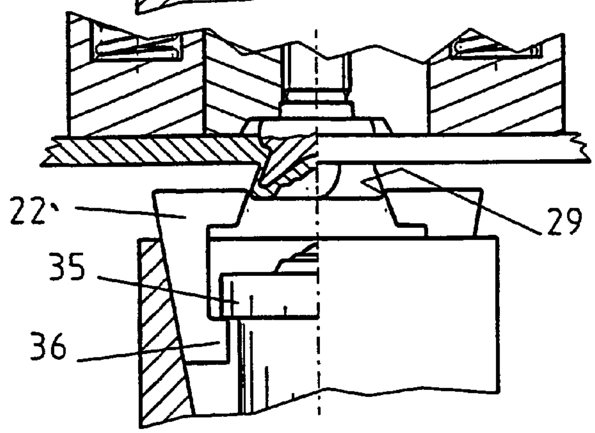
Figure 10B:
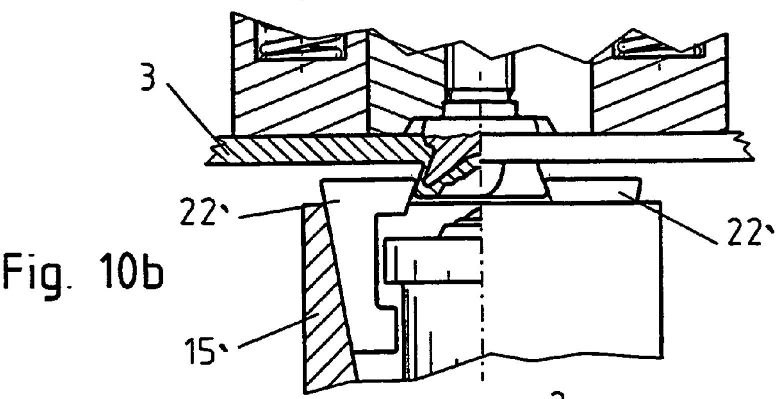
Figure 10A:
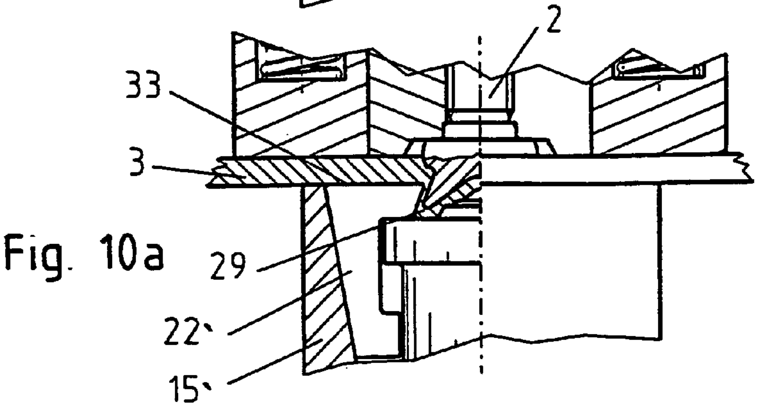

FIG. 10*d* shows the state after the work-piece 3 has been fully drawn out. In this instant the levers 22' can drop back into the die 15' again so that the recess 19 with the movable side walls formed by the levers 22' is again available for a new joining process.

What is claimed is:

1. A method of fastening an auxiliary joining element to a sheet metal work-piece wherein the auxiliary joining element includes a foot, comprising the steps of:

providing a die having a recess defined by a wall disposed in said die, wherein said wall is interrupted by die parts being movable radially inwardly of said wall;

retaining the sheet metal work-piece over said recess;

depressing the foot into the sheet metal work-piece thereby deforming the sheet-metal workpiece into said recess and holding said die parts radially inwardly of said wall thereby simultaneously deforming said sheet metal work-piece into the foot and forming spaced undercuts into the foot for retaining the auxiliary joining element to the sheet metal work-piece.

2. The method as set forth in claim 1, further including the step of forcing portions of the sheet metal work-piece spaced from the undercut into the undercut.

3. The method as set forth in claim 1, wherein said step of depressing the foot into the sheet metal work-piece is further defined by forming wall sections into the sheet metal work-piece generally parallel to a depressing direction of the foot.

4. The method as set forth in claim 1, further including the step of forcing said die parts radially outwardly while withdrawing the foot from said cavity thereby releasing the undercuts from said die parts.

5. The method as set forth in claim 1, wherein said step of forming undercuts in the foot is further defined by forming at least three undercuts in the foot.

6. The method as set forth in claim 1, wherein said step of depressing the foot into the sheet metal work-piece is further defined by providing the auxiliary joining element having an auxiliary shoulder and depressing the auxiliary shoulder downwardly thereby forcing the foot into the sheet metal work-piece.

7. The method as set forth in claim 6, wherein said step of providing the auxiliary joining element having an auxiliary shoulder is further defined by locating the auxiliary shoulder adjacent the sheet metal work-piece.

8. The method as set forth in claim 1, wherein said step of retaining the sheet metal work-piece over said recess is further defined by depressing two sheet metal-pieces over said recess.

9. The method as set forth in claim 8, wherein said step of depressing the foot into the sheet metal work-piece is further defined by depressing the foot into two sheet metal work-pieces.

10. An apparatus for fastening an auxiliary joining element to a sheet metal work-piece, comprising:

a plunger movable in pressing direction for deforming the sheet metal work-piece;

a die defining a recess with a peripheral wall being generally parallel to said pressing direction of said plunger and having movable wall sections spaced around said peripheral wall and being movable inwardly thereby forming an undercut in the auxiliary joining element and the sheet metal work-piece, wherein said plunger includes a holder adapted to engage the auxiliary joining element for driving the auxiliary holding element into the sheet meal work-piece.

11. The apparatus as set forth in claim 10, wherein said recess defines an axis and said peripheral wall disposed between said movable wall sections is generally parallel to said axis.

* * * * *